United States Patent
Marra et al.

(10) Patent No.: US 9,569,432 B1
(45) Date of Patent: Feb. 14, 2017

(54) EVALUATING CONTENT IN A COMPUTER NETWORKED ENVIRONMENT

(75) Inventors: Gregory Matthew Marra, San Francisco, CA (US); Frances Bordwell Haugen, Mountain View, CA (US)

(73) Assignee: Google Inc., Mountain View ( * ) Notice: Subject to any disclaimer, the term of this patent is extended or adjusted under 35 U.S.C. 154(b) by 245 days.

(21) Appl. No.: 13/572,570

(22) Filed: Aug. 10, 2012

(51) Int. Cl.
*G06F 17/30* (2006.01)

(52) U.S. Cl.
CPC ........................... *G06F 17/30* (2013.01)

(58) Field of Classification Search
CPC .......... G06Q 30/00; H04N 21/00; G06F 17/00
See application file for complete search history.

(56) References Cited

U.S. PATENT DOCUMENTS

| | | | |
|---|---|---|---|
| 6,023,714 A * | 2/2000 | Hill ....................... G06F 17/211 |
| | | | 715/235 |
| 7,315,848 B2 * | 1/2008 | Pearse et al. | |
| 7,990,854 B1 | 8/2011 | Huang et al. | |
| 8,010,480 B2 * | 8/2011 | Dave et al. ..................... 706/62 |
| 8,032,519 B2 * | 10/2011 | Groeneveld et al. ......... 707/713 |
| 8,145,630 B1 * | 3/2012 | Garg et al. .................... 707/722 |
| 2009/0125511 A1 | 5/2009 | Kumar | |
| 2011/0191321 A1 | 8/2011 | Gade et al. | |
| 2011/0314007 A1 * | 12/2011 | Dassa et al. .................. 707/723 |

FOREIGN PATENT DOCUMENTS

| | | | |
|---|---|---|---|
| WO | 2009085831 A1 | 7/2009 | |
| WO | WO-2009/085831 A1 | 7/2009 | |
| WO | WO2012055100 A1 * | 5/2012 | .............. H04W 4/12 |

OTHER PUBLICATIONS

Gomez et al. (Re-ranking of Yahoo Snippets with the JIRS Passage Retrieval System snippets, pp. 8, 2007).*
Liu et al (How do users describe their information need Query recommendation based Query recommendation based on snippet click model, Elsevier, Oct. 2011, pp. 13847-13856).*

* cited by examiner

*Primary Examiner* — Kevin Bates
*Assistant Examiner* — Jeyanath Jeyaratnam
(74) *Attorney, Agent, or Firm* — Patent Law Works LLP (57) ABSTRACT

Systems and methods of evaluating content in a computer networked environment are provided. The data processing system can provide a first link to content for display on a first web page and a second link to the content for display on a second web page. The first and second links have first and second snippets associated with the content, respectively. The system determines at least one of a first number of views and a first number of conversions of the first link and at least one of a second number of views and a second number of conversions of the second link. The system determines a quality metric of the first snippet and a quality metric of the second snippet. The system selects one of the first snippet and the second snippet based on the quality metric of the first snippet and the quality metric of the second snippet.

15 Claims, 4 Drawing Sheets

EVALUATING CONTENT IN A COMPUTER NETWORKED ENVIRONMENT

BACKGROUND

In a networked environment such as the Internet, web sites can provide a link to content, such as a news article, video, or blog post. By clicking on the link, a user can access the content and the content can be displayed on a user device. Many different web pages can provide links to the same content, allowing the content to proliferate through a computer network for viewing by a large number of users.

SUMMARY

At least one aspect is directed to a computer implemented method of evaluating content in a computer networked environment. The method provides a first link to content for display on a website. The first link has a first snippet associated with the content. The method provides a second link to the content for display on the website. The second link has a second snippet associated with the content. The method determines at least one of a first number of views and a first number of conversions of the first link and determines at least one of a second number of views and a second number of conversions of the second link. The method determines a quality metric of the first snippet based on at least one of the first number of views and the first number of conversions of the first link and determines a quality metric of the second snippet based on at least one of the second number of views and the second number of conversions of the second link. The method selects one of the first snippet and the second snippet based on the quality metric of the first snippet and the quality metric of the second snippet.

At least one aspect is directed to a system of evaluating content in a computer networked environment. The system includes a data processing system having at least one of a snippet selection circuit and a quality metrics circuit. The data processing system can provide a first link to content for display on a website. The first link has a first snippet associated with the content. The system can provide a second link to the content for display on the website. The second link has a second snippet associated with the content. The system determines at least one of a first number of views and a first number of conversions of the first link and determines at least one of a second number of views and a second number of conversions of the second link. The system determines a quality metric of the first snippet based on at least one of the first number of views and the first number of conversions of the first link and determines a quality metric of the second snippet based on at least one of the second number of views and the second number of conversions of the second link. The system selects one of the first snippet and the second snippet based on the quality metric of the first snippet and the quality metric of the second snippet.

At least one aspect is directed to a computer readable storage medium having instructions to evaluate content in a computer networked environment. The instructions include instructions to provide a first link to content for display on a website. The first link has a first snippet associated with the content. The instructions include instructions to provide a second link to the content for display on the website. The second link has a second snippet associated with the content. The instructions include instructions to determine at least one of a first number of views and a first number of conversions of the first link and to determine at least one of a second number of views and a second number of conversions of the second link. The instructions also include instructions to determine a quality metric of the first snippet based on at least one of the first number of views and the first number of conversions of the first link and to determine a quality metric of the second snippet based on at least one of the second number of views and the second number of conversions of the second link. The instructions include instructions to select one of the first snippet and the second snippet based on the quality metric of the first snippet and the quality metric of the second snippet.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and embodiments of, methods, apparatuses, and systems for evaluating content in a computer networked environment. The various concepts introduced above and discussed in greater detail below may be implemented in any of numerous ways, as the described concepts are not limited to any particular manner of implementation. Examples of specific implementations and applications are provided primarily for illustrative purposes.

In an Internet based social network, content sharing websites can provide a link to content, such as a news article, video or blog post. The link can include a snippet of the content. For example, the snippet can be a subset of content from the news article that can give a viewer of the snippet an indication of the full content of that news article. For example, the snippet can be pieces or components of the content of the news article such as all or part of a headline, an image from the news article, the name of an author or subject of the content, graphical content, video segments, or portions of text from the news article. By clicking on the link, which can include (or be presented concurrently with)

the snippet, a user can access the content. A more appealing or informative snippet can more accurately represent the content, increase user interest in the content, and increase the likelihood that the user will view the content when compared, for example, to an ambiguous or uninformative snippet. Thus, the snippet that appears with a link to the content can affect the number of times that the content is viewed.

In some implementations, a data processing system provides links with corresponding snippets for display on web pages, such as web pages of a social network website. The snippet can provide a snapshot of content, such as a news article, video, or blog post. Different snippets can represent the same content. For example, snippets can display different paragraphs or portions of text of the same news article or different frames of the same video. The various snippets can be clicked on at different rates to access the content. The data processing system can determine the click-through rate (or other quality metric) of the various links and attribute these rates at least in part to the quality of the snippet corresponding to the link. The data processing system can determine that one or more of the snippets are associated with more clicks (e.g. a higher quality snippet) and can select that snippet for display with renderings of the link on one or more web pages.

For example, the data processing system (e.g. at least one server) can provide a first link to content, such as a news article, on a first web page. The first link can include a first snippet, such as a plurality of elements from a news article, (e.g., a headline of the news article, a portion of text, or an image corresponding to an image of the news article). The data processing system can also provide a second link to the same content. The second link can include a second snippet of the same news article for display at a different social networking (or other) web page. In this example, the first snippet is displayed on the first web page and the second snipped is displayed on the second web page having a different website address (e.g. URL) than the first web page. The data processing system can track the performance of the snippets on the different web pages to identify a better performing snippet. For example, the snippet having the highest click through rate (or other quality metric) can be selected as the best performing snippet. With the best performing snippet identified, the data processing system can provide links to the content together with the best performing snippet.

This example, where different snippets representing the same content are provided on different web pages, may be employed when there are a relatively large number of users sharing the content on their respective social networking web pages. For example, thousands of social network users may be independently sharing a link to a news article regarding a celebrity. The data processing system can identify a statistically significant number of views or clicks corresponding to the snippets (e.g., more than 1000) to determine quality metrics (e.g., click through rate or click through volume) of the snippets. For example, the data processing system can select the snippet that generates more clicks, or more clicks per unit number of views or impressions, such as clicks per thousand impressions. In one implementation, the data processing system compares the click-through rate of the first snippet with the click through rate of the second snippet. The higher click through rate can be attributed to the better snippet. Once selected by the data processing system, links to the content can be provided with the better performing snippet.

In some implementations, the data processing system provides links to content for different impressions of the same web page. For example, a user of a social network can post a link to content on his or her social network web page. Other users visiting the social network web page can view the link. In this example, different snippets can be displayed with the link to different users viewing the same social network web page. For example, a first person may see one snippet on a friends social network web page, and a second person independently viewing the same social network web page may see another, different snippet representing the same content. In this example, the data processing system can identify impressions of the different snippets on the same web page, determine quality metrics for the different snippets, and select the snippet having best quality metric.

This example, where different snippets representing the same content are provided on different impressions of the same web page, may be employed when there are a relatively small number of users sharing the content on their respective social networking web pages. For example, a high school student may be sharing a link to a news article about the recent success of the high school's football team with a relatively small number of other social network users (e.g., other students in the high school) being likely to post a link to this same news article. The data processing system can identify a number of views or clicks corresponding to the different snippets provided for different impressions of the same web page to determine quality metrics (e.g., click through rate or click through volume) of the snippets. The data processing system can select the snippet having the best quality metric for that news article. Once selected, future links to that news article can be displayed with the selected snippet.

Figure 1:
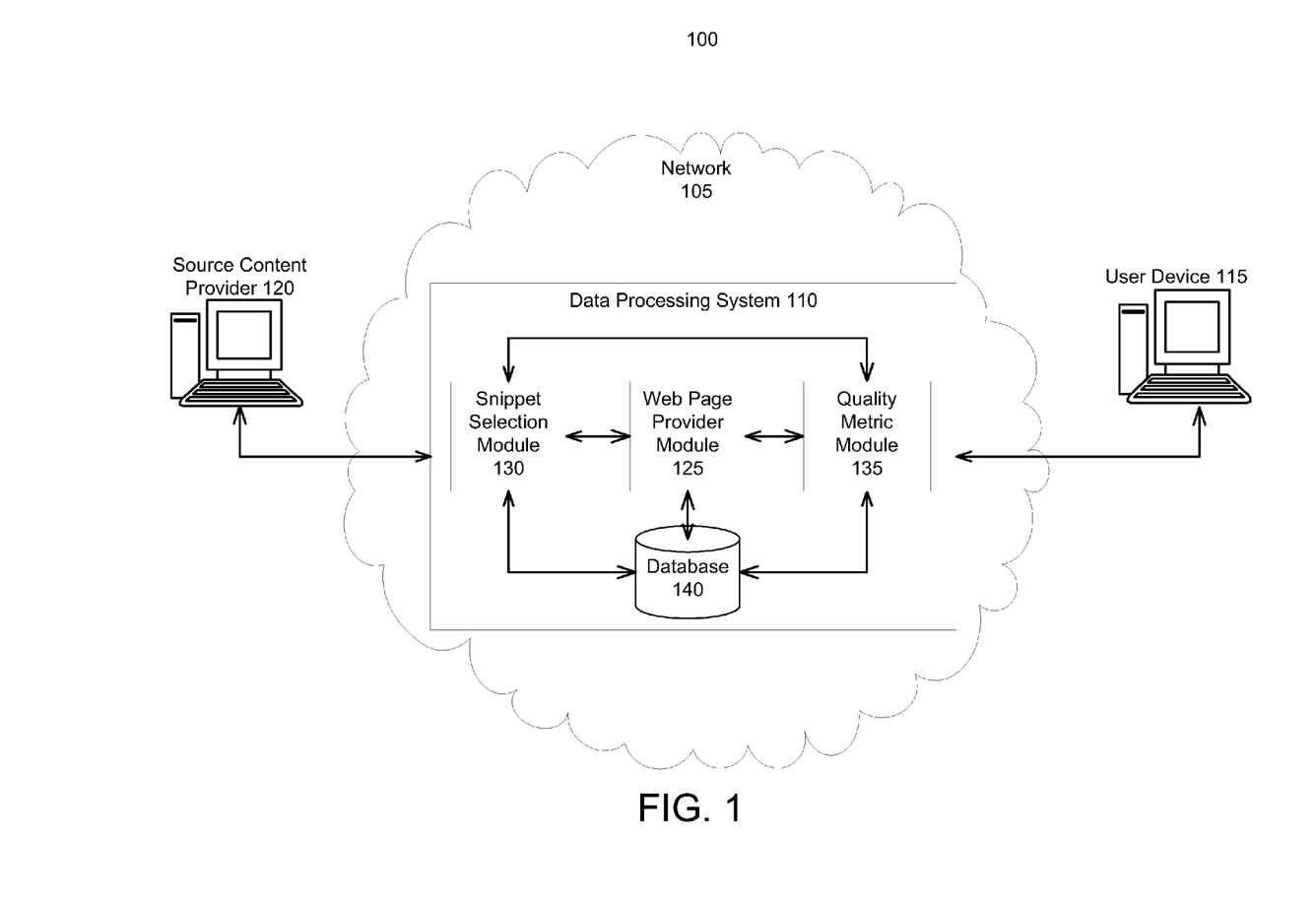
FIG. 1 is a block diagram depicting an example environment of evaluating content in a computer networked environment, according to an illustrative implementation.

FIG. 1 illustrates an example system 100 of evaluating content in a computer networked environment, via at least one computer network such as network 105. The network 105 can include computer networks such as the Internet, local, metro, or wide area networks, intranets, satellite networks, or and other communication networks such as voice or data mobile phone networks. The system 100 includes at least one data processing system 110. The data processing system 110 can include at least one processor or other logic device to communicate via the network 105 with at least one user device 115 (e.g., a laptop, desktop, tablet, personal digital assistant, smart phone, or portable computer), and at least one source content provider 120. The data processing system 110 can also include at least one web page provider circuit 125, at least one snippet selection circuit 130, at least one quality metric circuit 135, and at least one database 140.

The data processing system 110 can include at least one server configured to host web pages associated with a social network (or other) website. In one implementation, the data processing system 110 includes servers configured to provide web pages (or other documents) to the user device 115 via the network 105. The source content provider 120 may provide content that is accessible via a link on a web page provided by the data processing system 110. For example, the source content provider 120 can provide text, audio, or video for display on web pages. The source content provider 120 may include at least one server associated with a website that hosts videos. The content can include text, graphical content, video, audio, multimedia, or other content, as well as combinations thereof. Examples of the content include a video, a song, a news article, a blog post, a web page, a document, a discussion forum, an image or other graphical content, as well as combinations thereof.

The data processing system 110 can receive, for example, from a user of a user device 115, a request to access a web page via the network 105. Responsive to this request, the data processing system 110 can provide a web page to the user device 115 together with a link to content, such as a link to another web page, video, document, news article, audio, or combination thereof. The link can include a snippet that is associated with the content. The snippet may be a computer graphic that can be hyperlinked to navigate the user device to a different location within the same web page or to another web page. The snippet can include elements of the corresponding content such as text, a title, a sentence, a or a paragraph of the corresponding content. The snippet can also include graphical content such as a thumbnail image, a video segment, or a dynamic image including a plurality of image frames that appear sequentially, audio, or combinations thereof.

The snippet selection circuit 130 can include at least one processor or logic device to select a snippet associated with the content. The web page provider circuit 125 can include the same or a different processor or logic device to provide the web page for display at the user device 115 with the selected snippet. In one implementation, the snippet selection circuit 130 generates the snippet from the content. For example, the snippet selection circuit 130 can generate snippets according to a snippet generation criteria. For example, if the content is a news article, the snippet selection circuit 130 can generate a snippet based on the snippet generation criteria indicating that the snippet should include one or more elements of the news article, such as a headline, an identified portion of text (e.g., the first sentence), a quote in the news article, an image or picture corresponding to the news article, or combination thereof. In this example, the snippet selection circuit 130 can identify one or more elements of the content, and generate a snippet that includes one or more of the identified elements. In some implementations, the snippet selection circuit 130 generates a snippet by selecting one or more of the identified elements. In some implementations, the snippet selection circuit 130 can generate different snippets of the same content. A snippet is different from another snippet if it contains at least one element that is different from another snippet. Accordingly, some snippets may include common elements. For example, a first snippet of a news article can have a headline, a thumbnail, and a first portion of text that corresponds to the first paragraph of the news article. A different snippet of the same news article can have the same headline, the same thumbnail, but a first portion of text that corresponds to the third paragraph of the news article.

In another example, the content can be a video. In this example, the snippet selection circuit 130 may generate a snippet for every Nth image frame of the video, where N is an integer greater than 1. The snippet selection circuit 130 can also generate, identify, or select image frames (or other content) for the snippet based on time. For example, a snippet can select one or more image frames that are generated once per time period, e.g., every Nth second, minute, or hour, where N is a real number greater than zero.

In some implementations, the snippet selection circuit 130 analyzes the content to select elements for use as snippets. For example, the snippet selection circuit 130 may employ one or more element recognition techniques to identify at least one of the title of an article, a picture associated with the article, one or more paragraphs of the article, a relevant portion of text, quotes, or other content of a document represented by a snippet. In some implementations, where the content is a video, the snippet selection circuit 130 employs one or more image recognition techniques to identify faces, people, actions, colors, tones, patterns, or any other characteristic to select still images or image frames from the video as snippets. The snippets may be generated or selected by the snippet selection circuit 130 based on information associated with the user device 115, a user associated with the user device 115, or a person associated with a social network (or other) web page. For example, the snippet selection circuit 130 can select a snippet based on information or activity of other users who are users of the social networking website. This information can be obtained anonymously by the snippet selection circuit 130 so that no users are individually identified. A user can affirmatively opt-in to allow anonymous collection of their information, or opt-out to prohibit collection of this information. The information, when the user opts to provide it, may include anonymous demographic information, such as age, gender, marital status, children, income, occupation, geographic location, or language, for example. The information, when provided, can include anonymous information, information about businesses frequented, goods or services purchased, music or video preferences of the user, or purchase history should the user opt-in to provide this information.

In one implementation, the snippet selection circuit 130 receives at least one snippet or instructions to select a snippet from the source content provider 120. For example, the source content provider 120 can provide a snippet, or indicate a portion of the content from which the snippet should be selected. The data processing system 110 can provide the snippet for display with the web page at the user device 115. For example, the snippet selection circuit 130 may select the snippet provided by the source content provider 120 and forward it to the web page provider circuit 125 for further forwarding to the user device 115. In one example, the data processing system 110 receives instructions from the source content provider 120 indicating a schedule according to which the snippets are to be provided to user devices 115. In one implementation, the data processing system 110 obtains instructions from the source content provider 120 indicating which parts of the content to generate or provide as snippets.

The web page provider circuit 125 can provide a web page for display at the user device 115. The web page includes a link to content using the snippet selected by the snippet selection circuit 130 to represent the content. The user device 115 can access the web page containing the link and the snippet. The data processing system 110 can monitor activity on the web page, such as links being clicked. In one implementation, the quality metric circuit 135 can monitor the activities of at least one web page to determine click-through rates of at least one snippet. For example, the quality metric circuit 135 can monitor the number of page views of a web page or the number of click-throughs for the link on the web page. In some implementations, the quality metric circuit 135 determines the number of page views of a web page showing a link to content having a snippet, or determines the number of click-throughs for the link.

The data processing system 110 can provide different snippets with (or including) links to the same content. The data processing system 110 can evaluate views, impressions, and clicks on the snippets (or their corresponding links) to determine the most effective snippet (e.g. the snippet with the highest click-through rate) from amongst the various snippets.

In one implementation, the data processing system 110 provides one snippet for display on a web page, and provides a different snippet for display on another web page. In this example, a person (e.g. "Pete") can be the named user of his social networking web page. Pete can post a link to a news article on his social networking web page. The link to the video can include or be represented by a snippet. The data processing system 110 can provide the snippet for display on Pete's web page. Another person ("Steffi") can be the named user of her social networking web page. Steffi can post, on her social networking web page, a link having a different snippet to the same news article that Pete posted on his social networking web page. The data processing system can provide the different snippet for display on Steffi's web page. A third user (e.g., "Andre") can access Pete's social networking web page from Andre's user device 115. In this example, Andre is provided with a first snippet on Pete's web page. Andre can also access Steffi's social networking web page from Andre's user device 115. Andre is provided with a second snippet that is different than the snippet provided to Andre when Andre accessed Pete's social networking web page. In this example, Pete and Steffi's web pages display different snippets that represent the same content, e.g., a user clicking on either of these snippets will be brought to the same content. The data processing system 110 can provide the snippets for display to a plurality of user devices 115, and identify clicks on the snippets or their corresponding links. From this information, the data processing system 110 can determine the click-through rate (or other quality metric) for each of the snippets. Based on the click-through rates of the snippets, the data processing system 110 can identify the better performing snippet (e.g. the snippet having a higher click-through rate). This snippet can then be selected for future renderings of the link (e.g., on both Pete and Steffi's web page). In one implementation, the data processing system 110 pre-populates a snippet when the user posts the link to the content on a web page (e.g., at write-time) such that different users who access the user's social network web page view the same snippet.

In some implementations, the data processing system 110 provides one snippet for display on a web page to some user devices 115, and provides a different snippet for display on the same web page to other user devices 115. The different snippets in the example indicate the same content. In this example, a person (e.g. "Mark") can be the named user of a social network web page. Mark can post a link to an online classified ad for the sale of a car on a web page of the social network. The link to the online classified ad can include or be represented by a snippet. The snippet can include a price and a picture of the car for sale along with a headline of the classified ad that mentions "Very reliable car for Sale". The data processing system 110 can provide the snippet for display on Mark's web page. A second person (e.g. "Larry") can access Mark's web page from Larry's user device 115. In this example, Larry is provided with a first snippet on Mark's web page. A third user, (e.g., "Steve") can also access Mark's web page from Steve's user device 115. In this example, Steve is provided with a second snippet that is different than the snippet provided to Larry. The second snippet can include the price and the same picture of the car for sale along with a portion of the description of the classified ad that mentions "For sale is a 2008 VW Passat with 45,000 miles in immaculate condition". The data processing system 110 can provide the different snippets for display to a plurality of users (e.g., including Larry and Steve) with different renderings or impressions of the same web page, and can identify clicks on the snippets or their corresponding links From this information, the data processing system 110 can determine the click-through rate (or other quality metric) for each of the snippets, and based on the click-through rates of the snippets, identify the better performing snippet (e.g. the snippet having a higher click-through rate). This snippet can then be selected for future renderings of the link. In one implementation, the data processing system 110 changes the snippet corresponding to the link at read time, e.g., each time the web page is rendered to a user who accesses the user's web page.

The data processing system 110 can monitor activity associated with the first snippet and the second snippet. For example, the data processing system 110 can evaluate views, impressions, and clicks to determine the quality metrics of the first snippet and the second snippet. The data processing system 110 can compare quality metrics, such as the number of page views or the number of click-throughs, associated with the different snippets. The snippet with the highest click-through rate can be selected as the snippet for renderings of the link to the online classified ad on the social network (or other) web page.

In one implementation, the data processing system 110 includes a key or other identifier with the link when providing the link for display at the user device 115. The identifier can uniquely identify a particular snippet. In some implementations, the data processing system 110 uses the identifier to identify snippets for the determination of snippet quality metrics when content is shared on a social networking website not affiliated with the source content provider 120. For example, a person (e.g., "Arnold") can be the named user of a social network web page. Arnold can post a link to a news article being hosted at an external website, on a web page of the social network. The external website (e.g., a news reporting agency website) in this example is not part of the social network, and is operated by a separate entity than the entity that operates the social network. The link to the content can have a snippet with an associated identifier that allows the external website to track the performance of the snippets. The identifiers can uniquely identify a snippet and can be used to disambiguate between the snippets. In one implementation, the external website allows a user to share the video (or other content) directly from the external website, for example using a share button.

In this example, Arnold can share the external website video by posting a link to the news article on Arnold's social networking web page. The data processing system 110 can post the link together with a particular snippet associated with the external website and a unique identifier associated with the snippet. In one example, a query-parameter can be appended to all read page URLs that correspond to a specific snippet being tested. For example, the URL http://sample-newssite.com/read/1251253?snip=86562 can be associated with a link to content that includes a snippet identifier. In this example, the identifier is indicated by snip=86562. When a user of the social network clicks on the link on Arnold's social network web page, the external website can identify which snippet was provided to the user based on the identifier, and the data processing system 110 can obtain this information.

Continuing with this example, when a user clicks on the snippet of the link to content on a social network web page, the news article is displayed, and the data processing system 110 can identify which snippet was provided for display to the user when the user clicked on the link. The data processing system 110 can determine the number of views of the web page or click-throughs per snippet (e.g., a quality metric) to determine which snippet performs more effectively. Once the data processing system selects a snippet based on a quality metric, and the data processing system can display the selected snippet (e.g., on a social network web page) with links to the corresponding news article.

Figure 2:
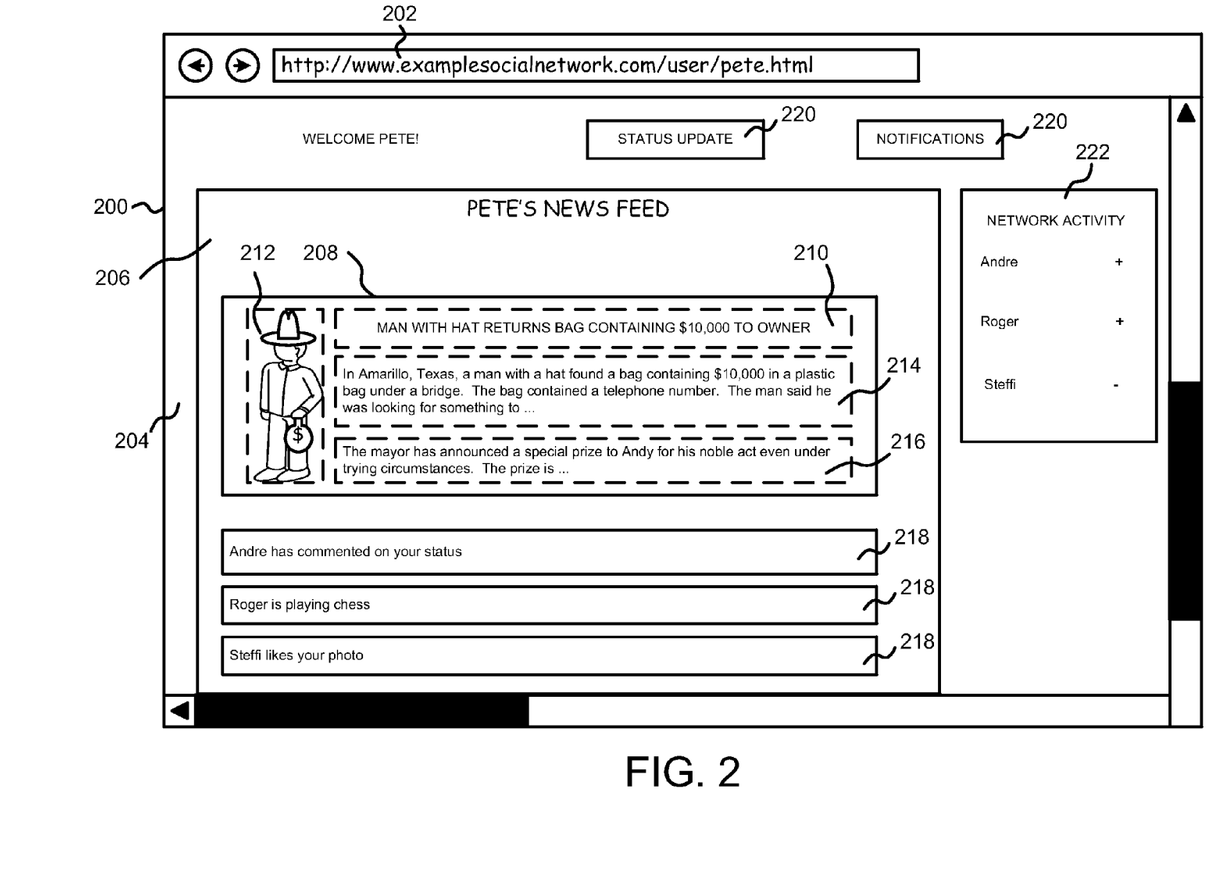
FIG. 2 is a block diagram depicting an example display of a web page having a snippet in a computer networked environment, according to an illustrative implementation.

FIG. 2 is a block diagram depicting an example display 200 illustrating a web page 204 having a snippet 208 in a computer networked environment. In some implementations, the display 200 can provide a web page 204 having a web page address 202 for display at a user device (e.g., the user device 115). The web page 204 can be a web page of a social network. In the example of FIG. 2, the web page 204 is a social network web page of a user "Pete". The web page 204 can include a news feed 206, one or more buttons 220 that can be clicked on to receive information from other web pages associated with the social network, and a network activity field 222 that, for example, provides information associated with users who are in the user's (e.g., Pete's) network.

In some implementations, the news feed 206 or other area of the web page 204 can include one or more links to content. The link can include at least one snippet 208 or can be provided for display with the web page 204 concurrently with the snippet 208. For example, the snippet 208 can be the link to additional content (e.g., on another web page), or the snippet 208 can be presented as a representation of the additional content, with the link to the additional content being provided elsewhere on the web page 204. The snippet 208 can include at least one element that represents the corresponding content such as text, a title, a sentence, or a paragraph of the corresponding content. The snippet 208 can also include graphical content such as a thumbnail image, a video segment, or a dynamic image including a plurality of image frames that appear sequentially, audio, or combinations thereof. For example, the snippet 208 can include elements such as a headline 210, a thumbnail 212, a first portion of text 214 and a second portion of text 216, or combinations thereof. In some implementations, the link may include the entire snippet 208 so that content represented by the snippet 208 can be accessed by clicking on the snippet 208. The link may include any region within the snippet 208. In some implementations, the link may include a portion of the snippet 208. For example, the link may include elements 210 and 212 and not elements 214 and 216. The news feed 206 can also include one or more updates 218 as well as additional snippets. These updates can indicate other users' activity on the social network, for example.

Figure 3:
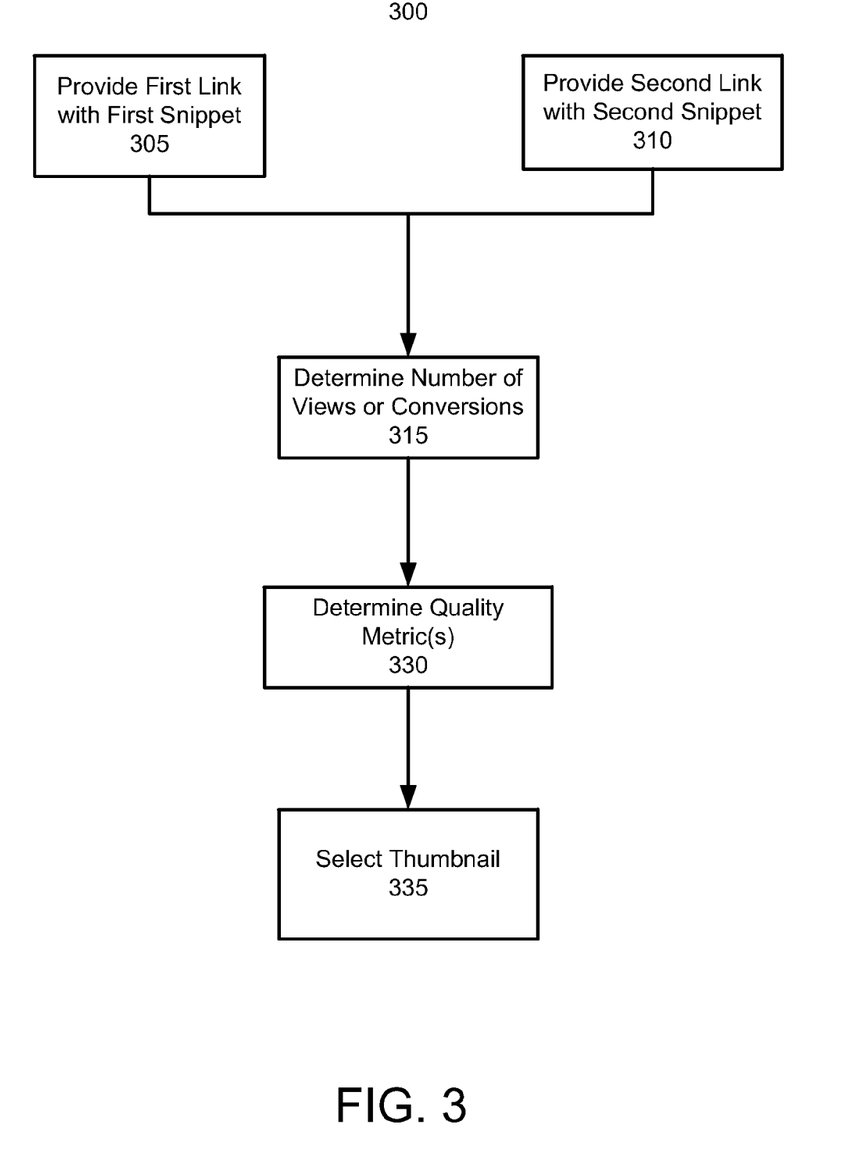
FIG. 3 is a flow diagram depicting a method of evaluating content in a computer networked environment, according to an illustrative implementation.

FIG. 3 illustrates a flow diagram depicting a method 300 of evaluating content in computer networked environment. In one implementation, the method 300 includes an act of providing a first link to content with a first snippet (BLOCK 305). The content can include a news article on a web page and the first snippet can include a headline, image, or portion of text corresponding to the first paragraph of the news article, for example. Continuing with this example, the data processing system can provide a link to the content together with the first snippet (BLOCK 305). The link can be provided (BLOCK 305) by the data processing system with the snippet for display on a web page of a social network.

The method 300 can also include an act of providing a second link (BLOCK 310). For example, the data processing system can provide a second link to content together with a second snippet (BLOCK 310). The second snippet can be same as the first snippet or can be a different snippet, such as a snippet that includes different elements of the news article than the first snippet. The data processing system can provide a second link (BLOCK 310) to the same content associated with the first link. The first and second link, and their corresponding snippets, can be provided for display (BLOCKS 305, 310) on the same website, different web pages of the same web site, or different impressions of the same web page, for example. In some implementations, the first link is provided (BLOCK 305) to a first plurality of user devices requesting access to a first web page, and the second link is provided (BLOCK 310) to a second plurality of user devices requesting access to a second web page. The second web page in this example can have the same or a different web page address than the first web page.

In one implementation, the method 300 can include the acts of providing at least one of the first link (BLOCK 305) and the second link (BLOCK 310) to at least one identified user device, for example, based at least in part on information about the user devices at which the snippets are displayed. In some implementations, the first link is provided (BLOCK 305) or the second link is provided (BLOCK 310) to the user device together with an identifier that uniquely identifies the snippet. In this example, the performance of a snippet associated with the link using the identifier can be determined. In some implementations, when the method 300 provides a first link (BLOCK 305) or provides a second link (BLOCK 310) to content that is shared from the source content provider, the method 300 provides a unique website address as the link to the content for each snippet.

The method 300 can include an act of determining a number of views or a number of conversions for links that are provided to user devices (BLOCK 315). For example, the data processing system can identify the number of times a web page containing a snippet is rendered for display at a user device or clicked by a user. In some implementations, the number of views or conversions are determined (BLOCK 315) by monitoring an identifier that identifies the snippet associated with the link. For example, the data processing system can monitor the number of page views for a particular URL corresponding to the identifier to determine a number of times content was viewed via a particular snippet.

The method 300 can include an act of determining at least one quality metric (BLOCK 330) of at least one snippet. The determined quality metric can include, for example, a click through rate or click through volume. For example, the quality metric of a snippet can be determined (BLOCK 330) based on the number of views or clicks of the snippet or its corresponding link. In some implementations, the quality metric is determined (BLOCK 330) based on a number of views of the content represented by an identified snippet.

The method 300 can include an act of selecting a snippet (BLOCK 335). For example, the snippet selection circuit can select a snippet having a quality metric above a threshold value or higher than a quality metric of another snippet. In one implementation, the method 300 provides links (BLOCK 305 or BLOCK 310) having various snippets to user devices and identifies activity associated with the snippets (BLOCK 315). The selected snippet (BLOCK 335) can generate the most attention for a news article on various websites, relative to other snippets used to represent the news article.

In some implementations, the data processing system utilizes the quality metrics associated with the snippets to select one of the snippets to correspond with the content based on the relative performance of each of the snippets. For example, the snippet with the greatest click-through rate or the greatest number of click-throughs may be selected. In one implementation, more than one snippet can be selected for use with a link to the content. For example, the data processing system can select at least one snippet to provide for display at the user device based on characteristics of the user device, information about the user of the user device, or characteristics of the user sharing the content, for example on a social network web page.

Figure 4:
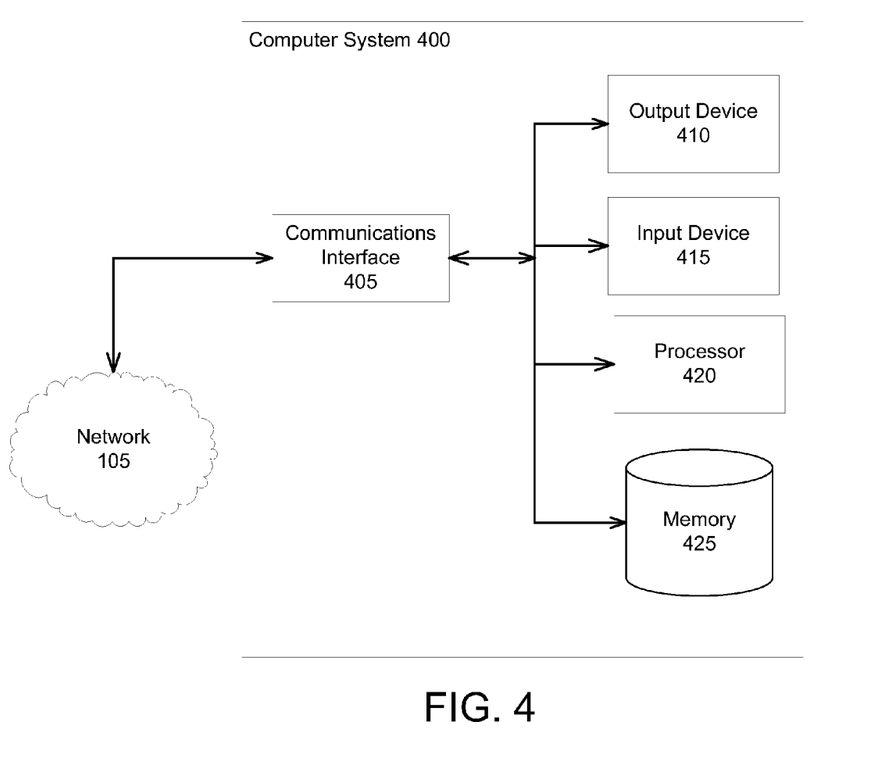
FIG. 4 is a block diagram illustrating a general architecture for a computer system that may be employed to implement various elements of the systems and methods described and illustrated herein, according to an illustrative implementation.

FIG. 4 shows the general architecture of an illustrative computer system 400 that may be employed to implement any of the computer systems discussed herein (including the system 100 and its components such as the web page provider circuit 125, the snippet selection circuit 130, and the quality metrics circuit 135) in accordance with some embodiments. The computer system 400 can be used to evaluate content in a computer networked environment. The computer system 400 of FIG. 4 comprises one or more processors 420 communicatively coupled to memory 425, one or more communications interfaces 405, and one or more output devices 410 (e.g., one or more display units) and one or more input devices 415. The processors 420 can be included in the data processing system 110, the source content provider 120, the user device 115 or the other components of the system 100 such as the web content provider circuit 125, the snippet selection circuit 130, and the quality metrics circuit 135.

In the computer system 400 of FIG. 4, the memory 425 may comprise any computer-readable storage media, and may store computer instructions such as processor-executable instructions for implementing the various functionalities described herein for respective systems, as well as any data relating thereto, generated thereby, or received via the communications interface(s) or input device(s) (if provide for display). Referring again to the system 100 of FIG. 1, the web content provider circuit 125, the snippet selection circuit 130, or the quality metrics circuit 135 can include the memory 425 to store the profiles of users, the content, as well as the information used to generate and provide snippets and links to the content. The processor(s) 420 shown in FIG. 4 may be used to execute instructions stored in the memory 425 and, in so doing, also may read from or write to the memory various information processed and or generated pursuant to execution of the instructions.

The processor 420 of the computer system 400 shown in FIG. 4 also may be communicatively coupled to or control the communications interface(s) 405 to transmit or receive various information pursuant to execution of instructions. For example, the communications interface(s) 405 may be coupled to a wired or wireless network, bus, or other communication means and may therefore allow the computer system 400 to transmit information to and/or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 400. Examples of communications interfaces 405 include user interfaces (e.g., web pages) having links to content with associated snippets selected by the data processing system 110 for placement on the web pages to be provided to the user devices 115.

The output devices 410 of the computer system 400 shown in FIG. 4 may be provided, for example, to allow various information to be viewed or otherwise perceived in connection with execution of the instructions. The input device(s) 415 may be provided, for example, to allow a user to make manual adjustments, make selections, enter data or various other information, or interact in any of a variety of manners with the processor during execution of the instructions. Additional information relating to a general computer system architecture that may be employed for various systems discussed herein is provided at the conclusion of this disclosure.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The term "data processing system" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The web content provider circuit 125, the snippet selection circuit 130, and the quality metrics circuit 135 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 400 or system 100 can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of the systems and methods described herein. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. For example, the web content provider circuit 125, the snippet selection circuit 130, and the quality metrics circuit 135 can be a single module, a logic device having one or more processing circuits, or part of a search engine. In addition, one or more of the user device 115 and the source content provider 120 can include one or more circuits that are configured to perform some or substantially all of the functionality being performed by the data processing system in general, or specifically, the web content provider circuit 125, the snippet selection circuit 130, the quality metrics circuit 135, or any combination thereof.

Having now described some illustrative implementations and embodiments, it is apparent that the foregoing is illustrative and not limiting, having been provide for displayed by way of example. In particular, although many of the examples provide for displayed herein involve specific combinations of method acts or system elements, those acts and those elements may be combined in other ways to accomplish the same objectives. Acts, elements and features discussed only in connection with one embodiment are not intended to be excluded from a similar role in other implementations or embodiments.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate embodiments consisting of the items listed thereafter exclusively. In one embodiment, the systems and methods described herein consist of one, each combination of more than one, or all of the described elements, acts, or components.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the disclosed systems or methods, their components, acts, or elements to single or plural configurations. References to any act or element being based on any information, act or element may include embodiments where the act or element is based at least in part on any information, act, or element.

Any implementation disclosed herein may be combined with any other implementation or embodiment, and references to "an implementation," "some implementation," "an alternate implementation," "various implementation," "one implementation" or the like are not necessarily mutually exclusive and are intended to indicate that a particular feature, structure, or characteristic described in connection with the embodiment may be included in at least one implementation or embodiment. Such terms as used herein are not necessarily all referring to the same embodiment. Any embodiment may be combined with any other embodiment, inclusively or exclusively, in any manner consistent with the aspects and embodiments disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, where links having snippets are provided for display on a web page, the snippets (or one or more elements of the snippet) can be part of the links (e.g. the snippet can be clicked to access the underlying content), or the snippet (or one or more elements of the snippet) can be a separate non-link graphic that is provided together with a link to the content that is represented by the snippet. The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A computer implemented method of evaluating content in a computer networked environment, comprising:

providing, by a data processing system, a first link to a content document for display on a first online service, the first link being displayed in association with a first snippet, the first snippet being a first portion of the content document;

determining, from the content document, a second snippet, the second snippet being a second portion of the content document;

providing, by the data processing system, a second link to the content document for display on a second online service, the second link being displayed in association with the second snippet;

determining at least one of a first number of views and a first number of conversions of the first link and at least one of a second number of views and a second number of conversions of the second link;

determining a quality metric of the first snippet based on at least one of the first number of views and the first number of conversions of the first link, and determining a quality metric of the second snippet based on at least one of the second number of views and the second number of conversions of the second link;

identifying a device type of a user device;

selecting, for display at the user device, one of the first snippet and the second snippet as a selected snippet based on the quality metric of the first snippet, the quality metric of the second snippet and the device type; and modifying the first link and the second link to correspond to the selected snippet.

2. The computer-implemented method of claim 1, further comprising:
providing the first link for display on a first web page having a first web address; and
providing the second link for display on a second web page having a second web address that is different from the first web address.

3. The computer-implemented method of claim 1, wherein at least one of the first snippet and the second snippet include at least one of a title of the content document, an image of the content document, a frame of a video of the content document, and text associated with the content document.

4. The computer-implemented method of claim 1, further comprising:
associating an identifier corresponding to the first snippet with the first link, wherein the identifier is unique to the first snippet.

5. The computer-implemented method of claim 1, further comprising:
selecting first subject matter of the first snippet from a combination of elements of the content document for display with a first impression of the first web page; and
selecting second subject matter of the first snippet from the combination of elements of the content document for display with a second impression of the first web page.

6. The computer-implemented method of claim 5, wherein the first subject matter of the first snippet and the second subject matter of the first snippet include a common element of the content document, and include at least one different element of the content document.

7. A system of evaluating content in a computer networked environment, comprising:
a data processing system having at least one of a snippet selection circuit and a quality metrics circuit, the data processing system configured to:
provide a first link to a content document for display on a first online service, the first link being displayed in association with a first snippet, the first snippet being a first portion of the content document;
determine, from the content document, a second snippet, the second snippet being a second portion of the content document;
provide a second link to the content document for display on a second online service, the second link being displayed in association with the second snippet;
determine at least one of a first number of views and a first number of conversions of the first link and at least one of a second number of views and a second number of conversions of the second link;
determine a quality metric of the first snippet based on at least one of the first number of views and the first number of conversions of the first link, and determining a quality metric of the second snippet based on at least one of the second number of views and the second number of conversions of the second link;
identify a device type of a user device;
select, for display at the user device, one of the first snippet and the second snippet as a selected snippet based on the quality metric of the first snippet, the quality metric of the second snippet and the device type; and
modifying the first link and the second link to correspond to the selected snippet.

8. The system of claim 7, further comprising:
the data processing system configured to:
provide the first link for display on a first web page having a first web address; and
provide the second link for display on a second web page having a second web address that is different from the first web address.

9. The system of claim 7, wherein at least one of the first snippet and the second snippet include at least one of a title of the content document, an image of the content document, a frame of a video of the content document, and text associated with the content document.

10. The system of claim 7, wherein the data processing system is configured to associate an identifier with the first link, wherein the identifier identifies the first snippet and is unique to the first snippet.

11. The system of claim 7, further comprising:
the data processing system configured to:
select first subject matter of the first snippet from a combination of elements of the content document for display with a first impression of the first web page; and
select second subject matter of the first snippet from the combination of elements of the content document for display with a second impression of the first web page.

12. The system of claim 11, wherein the first subject matter of the first snippet and the second subject matter of the first snippet include a common element of the content document, and include at least one different element of the content document.

13. A non-transitory computer readable storage medium having instructions to evaluate content in a computer networked environment, the instructions comprising instructions to:
provide a first link to a content document for display on a first online service, the first link being displayed in association with a first snippet, the first snippet being a first portion of the content document;
determine, from the content document, a second snippet, the second snippet being a second portion of the content document;
provide a second link to the content document for display on a second online service, the second link being displayed in association with the second snippet;
determine at least one of a first number of views and a first number of conversions of the first link and determine at least one of a second number of views and a second number of conversions of the second link;
determine a quality metric of the first snippet based on at least one of the first number of views and the first number of conversions of the first link, and determine a quality metric of the second snippet based on at least one of the second number of views and the second number of conversions of the second link;
identify a device type of a user device;
select, for display at the user device, one of the first snippet and the second snippet as a selected snippet based on the quality metric of the first snippet, the quality metric of the second snippet and the device type; and modifying the first link and the second link to correspond to the selected snippet.

14. The non-transitory computer readable storage medium of claim 13, further comprising instructions to:
provide the first link for display on a first web page having a first web address; and
provide the second link for display on a second web page having a second web address that is different from the first web address.

15. The non-transitory computer readable storage medium of claim 13, wherein at least one of the first snippet and the second snippet include at least one of a title of the content document, an image of the content document, a frame of a video of the content document, and text associated with the content document.

\* \* \* \* \*

UNITED STATES PATENT AND TRADEMARK OFFICE
CERTIFICATE OF CORRECTION

| | | |
|---|---|---|
| PATENT NO. | : 9,569,432 B1 | |
| APPLICATION NO. | : 13/572570 | |
| DATED | : February 14, 2017 | |
| INVENTOR(S) | : Gregory Matthew Marra and Frances Bordwell Haugen | |

It is certified that error appears in the above-identified patent and that said Letters Patent is hereby corrected as shown below:

In the Specification

In Column 4, Line 39, please replace "and" with --any--

In Column 7, Line 48, please replace "Sale"." with --sale."--

In Column 9, Line 10, please replace ""Pete"." with --"Pete."--

In Column 9, Line 30, please delete "or"

In Column 12, Line 54, please replace "nels"," with --nels,"--

In Column 13, Line 29, after not, please insert --be--

In Column 13, Line 60, after "magnetic" please insert --disks--

In Column 15, Line 36, please replace "provide for" with --provided or--

In Column 15, Line 38, please replace "provide for" with --provided or--

In Column 16, Line 4, please replace "various implementation" with --various implementations--

Signed and Sealed this
Twenty-sixth Day of September, 2017

Joseph Matal
*Performing the Functions and Duties of the
Under Secretary of Commerce for Intellectual Property and
Director of the United States Patent and Trademark Office*